US011239659B2

(12) United States Patent
Thompson et al.

(10) Patent No.: US 11,239,659 B2
(45) Date of Patent: Feb. 1, 2022

(54) MICROGRID AUTOSYNCHRONIZING USING REMOTE RECLOSER INPUTS AND OUTPUTS

(71) Applicant: Schweitzer Engineering Laboratories, Inc., Pullman, WA (US)

(72) Inventors: Craig Thompson, Palouse, WA (US); Scott M Manson, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 216 days.

(21) Appl. No.: 16/435,835

(22) Filed: Jun. 10, 2019

(65) Prior Publication Data
US 2020/0389027 A1 Dec. 10, 2020

(51) Int. Cl.
*H02J 3/06* (2006.01)
*H02J 3/44* (2006.01)
*H02J 3/46* (2006.01)
*H02J 3/38* (2006.01)

(52) U.S. Cl.
CPC ........ *H02J 3/06* (2013.01); *H02J 3/44* (2013.01); *H02J 3/46* (2013.01); *H02J 3/388* (2020.01)

(58) Field of Classification Search
None
See application file for complete search history.

(56) References Cited

U.S. PATENT DOCUMENTS

| 6,845,333 | B2 | 1/2005 | Anderson |
| 8,346,402 | B2 * | 1/2013 | Guzman-Casillas ........................ G01R 19/2513 700/293 |
| 9,478,378 | B2 | 10/2016 | Kasztenny |
| 2003/0080741 | A1 * | 5/2003 | LeRow ................. H02M 7/493 324/320 |
| 2010/0138066 | A1 * | 6/2010 | Kong ..................... G06Q 40/06 700/295 |

(Continued)

FOREIGN PATENT DOCUMENTS

| CN | 102841279 B | * 10/2014 | ............... H02J 3/38 |
| EP | 3042429 A1 | * 7/2016 | ............... H02J 3/38 |
| WO | 2013115908 | 8/2013 | |

OTHER PUBLICATIONS

Shi et al., "Active Synchronization Control for Microgrid Reconnection after Islanding", Oct. 2014, 5th IEEE PES Innovative Smart Grid Technologies Europe (ISGT Europe). (Year: 2014).*

*Primary Examiner* — Mohammad Ali
*Assistant Examiner* — Kelvin Booker
(74) *Attorney, Agent, or Firm* — Bradley W. Schield

(57) ABSTRACT

The present disclosure relates to a recloser control that provides autosynchronization of a microgrid to an area electric power system (EPS). For example, a recloser control may include an output connector that is communicatively coupled to a recloser at a point of common coupling (PCC) between the area EPS and the microgrid. The recloser control may include a processor that acquires a first set of measurements indicating electrical characteristics of the area EPS and acquires a second set of measurements indicating electrical characteristics of the microgrid. The recloser control may send synchronization signals to a microgrid controller to synchronize the microgrid controller based on the first set of measurements and the second set of measurements.

17 Claims, 5 Drawing Sheets

(56) References Cited

U.S. PATENT DOCUMENTS

| | | | | |
|---|---|---|---|---|
| 2011/0276192 A1* | 11/2011 | Ropp | | H02J 13/0006 700/293 |
| 2012/0215368 A1* | 8/2012 | Sharma | | H02J 3/32 700/287 |
| 2013/0114302 A1* | 5/2013 | Escobar | | H02J 3/38 363/13 |
| 2013/0289787 A1* | 10/2013 | Rouse | | G06Q 50/06 700/291 |
| 2014/0148960 A1* | 5/2014 | Bhageria | | G05B 15/02 700/286 |
| 2014/0156095 A1* | 6/2014 | Rouse | | G05F 1/66 700/291 |
| 2014/0191591 A1* | 7/2014 | Kasztenny | | H01H 47/00 307/141 |
| 2014/0214222 A1* | 7/2014 | Rouse | | G06Q 10/06 700/291 |
| 2014/0351010 A1* | 11/2014 | Kong | | G06Q 40/04 705/7.29 |
| 2015/0032278 A1* | 1/2015 | Bhageria | | H02J 4/00 700/295 |
| 2015/0081127 A1* | 3/2015 | Bhageria | | H02J 3/38 700/295 |
| 2015/0094871 A1* | 4/2015 | Bhageria | | H02J 3/00 700/297 |
| 2015/0295581 A1* | 10/2015 | Shi | | H02J 3/40 700/287 |
| 2015/0380940 A1* | 12/2015 | Bhowmik | | H02J 3/381 307/69 |
| 2016/0190790 A1* | 6/2016 | Oudalov | | H02H 3/08 361/66 |
| 2016/0266559 A1* | 9/2016 | Shi | | H02J 3/40 |
| 2017/0077703 A1* | 3/2017 | Ropp | | H02J 13/00034 |
| 2017/0160711 A1* | 6/2017 | Wong | | G05B 19/042 |
| 2017/0214249 A1* | 7/2017 | Seeley | | H02J 3/44 |
| 2017/0271872 A1* | 9/2017 | Ravikumar | | H02J 3/381 |
| 2017/0271882 A1* | 9/2017 | Ravikumar | | H02J 3/381 |
| 2017/0346290 A1* | 11/2017 | Manson | | H02J 3/46 |
| 2018/0152022 A1* | 5/2018 | Manson | | H02J 3/14 |
| 2018/0375338 A1* | 12/2018 | Manson | | H02J 3/381 |
| 2019/0312455 A1* | 10/2019 | Medici | | H02J 3/40 |
| 2019/0319481 A1* | 10/2019 | Jin | | H02J 3/32 |
| 2020/0389032 A1* | 12/2020 | Thompson | | H02J 3/40 |
| 2020/0389048 A1* | 12/2020 | Manson | | H02H 3/44 |

* cited by examiner

MICROGRID AUTOSYNCHRONIZING USING REMOTE RECLOSER INPUTS AND OUTPUTS

TECHNICAL FIELD

The present disclosure relates generally to reclosers in electric power systems and, more particularly, to a recloser control that communicates synchronization signals to synchronize distributed energy resources of a microgrid.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems include equipment, such as generators, power lines, transformers, and the like, that provide electrical energy from a source to one or more loads. Some electric power delivery systems may include distributed energy resources (DERs) that provide electrical energy to various loads in the electric power delivery system from distributed locations in the power grid. For example, DERs may provide power in a microgrid connected to an area electric power system (EPS) such that the loads from the microgrid use power from the area EPS and the DERs and/or the DERs provide power to loads on the area EPS. Further, the DERs may be electrically disconnected from the area EPS, also referred to as being islanded.

Some microgrids may have a microgrid controller that sends control signals to the DERs to control operation of the microgrid. In other microgrids, the DER controllers may control operation of the DER without a centralized microgrid controller. In each of these cases, by islanding the microgrid from the area EPS, the DERs may operate independently from the area EPS, for example, to provide power to prioritized loads during an outage on the area EPS.

However, because the DERs operate independently of the area EPS when islanded, the DERs and the area EPS may provide power asynchronously from each other. That is, the DERs may operate at a different voltage, different phase, a different frequency, or any combination thereof, than the power generated on the area EPS. Accordingly, there is a need in the field to synchronize power generation from DERs with power on an area EPS to reconnect the microgrid to the area EPS.

As described below, recloser controls may be electrically connected to a recloser at a point of common coupling (PCC) between DERs on a microgrid and an area EPS. The recloser control may receive measurements of electrical characteristics of the area EPS and measurements of electrical characteristics of the microgrid. The recloser control may determine synchronizing control signals to send to cause synchronization of the DERs with the area EPS to allow the recloser control to close the recloser and reconnect the microgrid to the area EPS.

Figure 1:
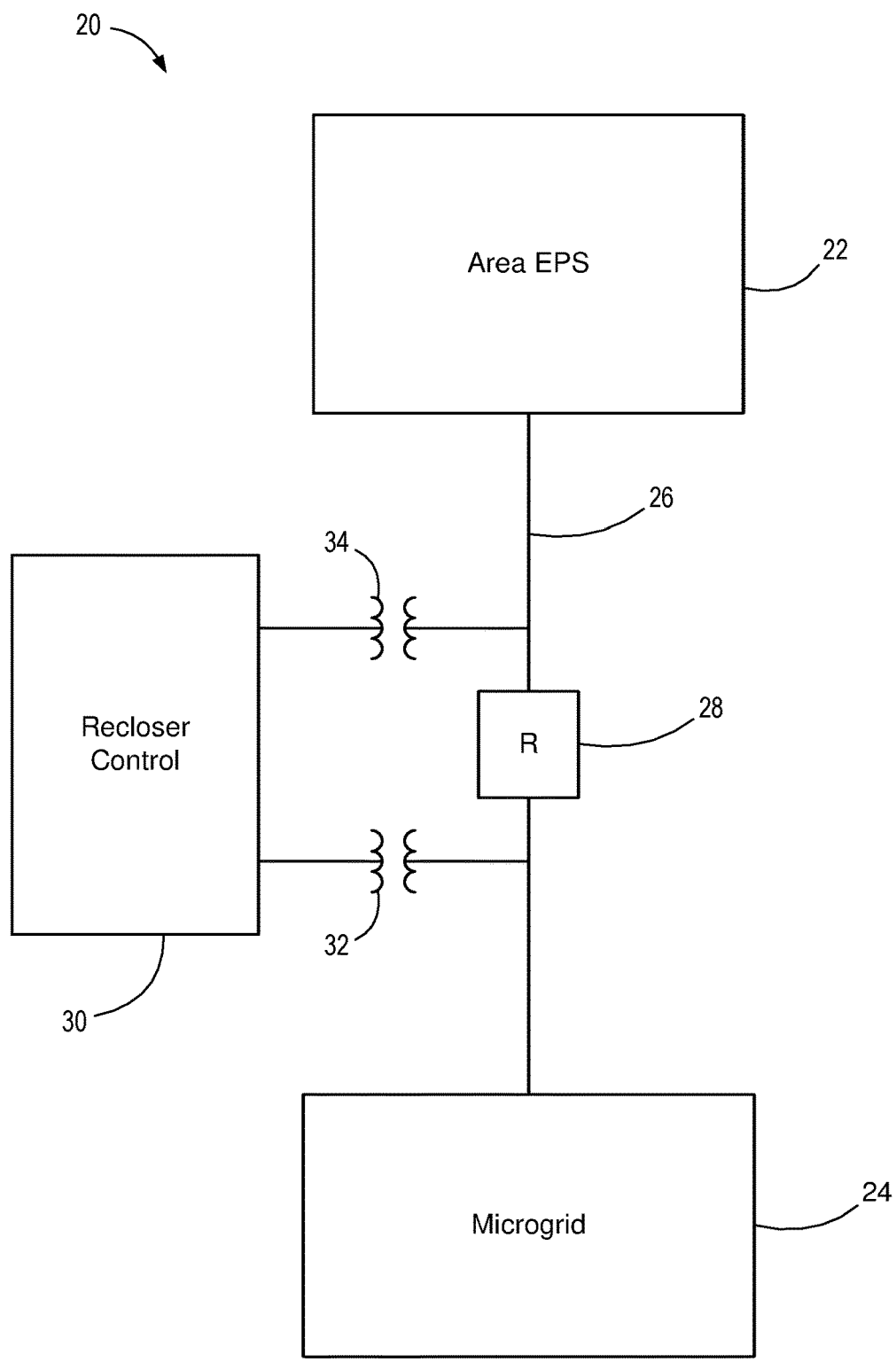
FIG. 1 is a one-line diagram of an electric power delivery system having a recloser control communicatively coupled to a recloser at a point of common coupling (PCC) between a microgrid and an area electric power system (EPS), in accordance with an embodiment.

FIG. 1 illustrates a one-line diagram of an electric power delivery system 20, in accordance with an embodiment. The electric power delivery system 20 includes an area EPS 22, such as a utility power grid, which may have various electric transmission lines, electric distribution lines, current transformers, buses, switches, circuit breakers, reclosers, transformers, autotransformers, tap changers, voltage regulators, capacitor banks, generators, motors, pumps, compressors, valves, and a variety of other types of monitored equipment. The area EPS 22 is electrically connected to a microgrid 24 via a first power line 26. The microgrid 24 may include various electrical equipment, such as those described above with respect to the area EPS 22.

At a PCC, a recloser 28 may selectively connect the microgrid 24 to the area EPS 22. For instance, the recloser 46 may be located on an overhead power distribution line that enters the microgrid 24. The electric power delivery system 20 further includes a recloser control 30 communicatively coupled to the recloser 28 to send control signals to the recloser 28.

In the illustrated embodiment, the recloser control 30 may include a first potential transformer (PT) 32 coupled between the recloser 28 and the microgrid 24 and a second PT 34 coupled between the recloser 28 and the area EPS 22. The recloser control 30 may receive a signal indicating the voltage on the power line 26 between the recloser 28 and the area EPS 22 via the potential transformer 34, and receive a signal indicating the voltage on the power line 26 between the recloser 28 and the micogrid 24 via the potential transformer 32.

The recloser control 30 may detect events on the power line 26 based on the voltage signals (e.g., via the PTs 32 and 34), current signals, and the like. For instance, a transient fault may occur on the overhead power distribution line of the recloser 28. The recloser control 30 may detect a transient event (e.g., overcurrent event, undercurrent event, overvoltage event, undervoltage event, etc.) and send a signal to the recloser 28 to open (i.e., trip) the recloser 28 and to subsequently close the recloser 28. For example, the recloser control 30 may be set to close the recloser 28 after a predetermined period of time to allow a transient fault to resolve. Further, the recloser control 30 may attempt to close and open a set amount of times prior to lock out in which the recloser remains in the open position, for example, until a user or another device communicates to the recloser control 30 to close. By opening and closing the recloser 30 a set amount of times prior to lock out, the recloser control 30 may protect the electric power delivery system 20 from transient events while continuing to provide power subsequent to the transient event.

As explained above, the microgrid 24 may be islanded such that the microgrid 24 is disconnected from the area EPS 22, for example, due to an event in the microgrid 24 or the area EPS 22. For instance, the microgrid 24 may be electrically disconnected from the area EPS 22 due to a fault on the power line 26. While disconnected, the microgrid 24 and the area EPS 22 may operate independently of each other.

Figure 2:
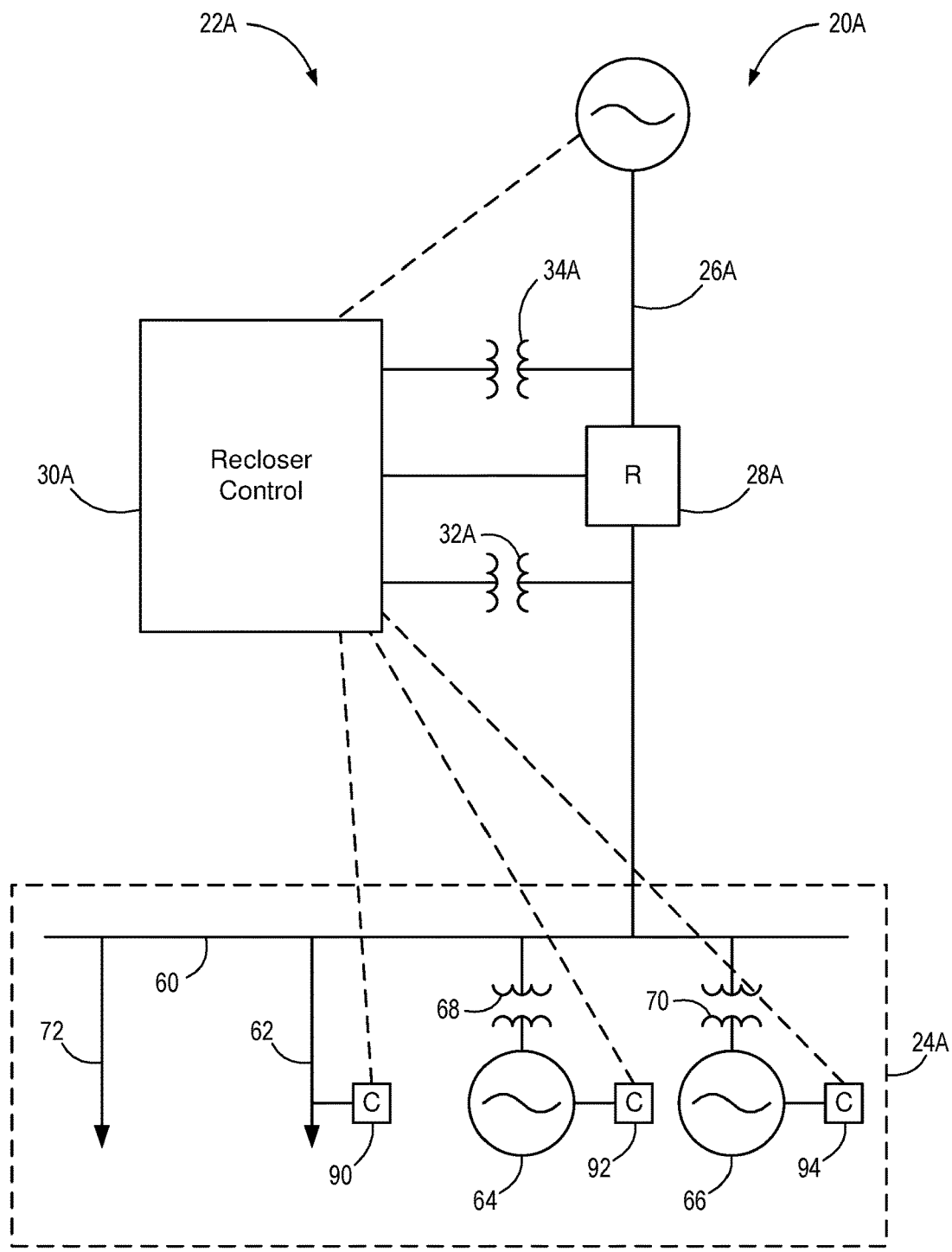
FIG. 2 is a one-line diagram of an example of the electric power delivery system of FIG. 1 in which the recloser control communicates with distributed energy resources (DERs) of the microgrid, in accordance with an embodiment.

FIG. 2 is an example of an embodiment of the electric power delivery system 20 of FIG. 1 with a particular configuration of a microgrid 24A, in accordance with an embodiment. As illustrated, the microgrid 24 includes distributed energy resources (DERs), such as one or more controllable loads 62, a first distributed generator 64, and a second distributed generator 66, each connected to a bus 60. The generators 64 and 66 are connected to the bus 60 via respective potential transformers (PTs) 68 and 70 and may provide electrical power to the loads 62 and 72.

In the illustrated embodiment, the controllable load 62, the first distributed generator 64, and the second distributed generator 66 may be controlled via respective DER controllers 90, 92, and 94. For example, the DER controller 92 of the generator 64 may monitor voltages of the microgrid 24 and regulate the flow of fuel and other controls of the generator 64 based on the microgrid 24. Further, the DERs may be electrically coupled to the area EPS 22A via the power lines 26A to receive power generated on the area EPS 22A or to supply power to loads on the area EPS 22A.

Figure 3:
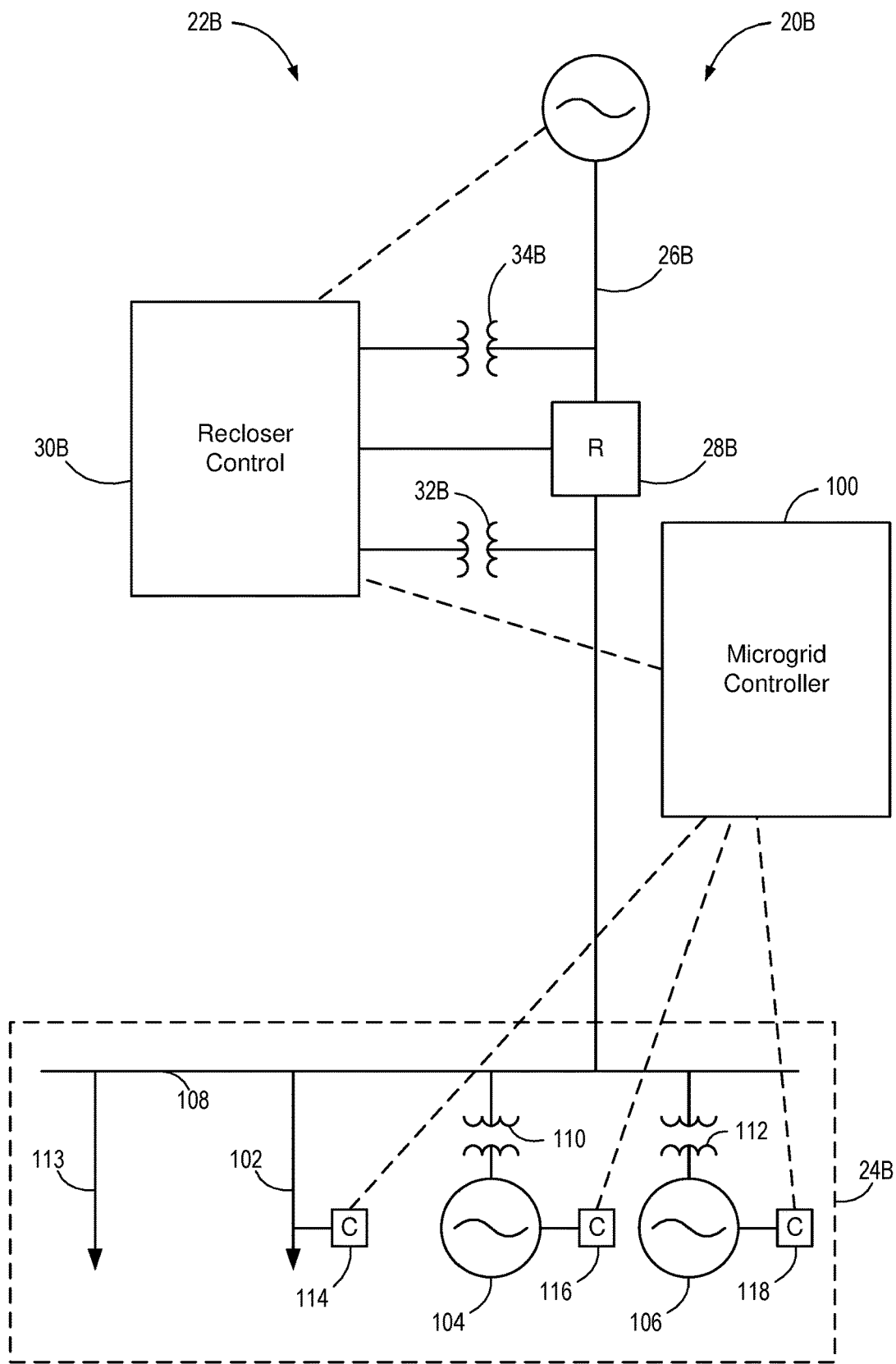
FIG. 3 is a one-line diagram of an example of the electric power delivery system of FIG. 1 in which the recloser control communicates with a microgrid controller, in accordance with an embodiment.

FIG. 3 is a one-line diagram of an example of the electric power delivery system 20 of FIG. 1 with another configuration of a microgrid 24B, in accordance with an embodiment. Similar to FIG. 2, the microgrid 24B includes DERs, such as one or more controllable loads 102, a first distributed generator 104, and a second distributed generator 106, each connected to a bus 108. The generators 104 and 106 are connected to the bus 108 via respective potential transformers (PTs) 110 and 112 and may provide electrical power to the loads 102 and 113.

As illustrated in FIG. 3, the microgrid 24 is controlled and/or managed by a microgrid controller 100. For example, the microgrid controller 100 may be embodied as an SEL-3555 real-time automation controller from Schweitzer Engineering Laboratories, Inc., located in Pullman, Wash. The microgrid controller 100 may receive voltage and current measurements from various electronic devices in the electric power delivery system 20, such as voltage measurements from the recloser control 30 and/or the DER controllers. The microgrid controller 100 may send control signals to the DER controllers 114, 116, and 118 of the controllable load 102, the first distributed generators 104, and the second distributed generator 106 to control operation of the microgrid 24B such that the controllable loads 62 and the generators 64 and 66 maintain a desired frequency and voltage. For instance, if frequency in the microgrid 24B is decreasing, the microgrid controller 100 may send a control signal to the controller 116 of the generator 104 to increase the supply of fuel to the generator 104, thereby increasing the frequency. In such control systems, the microgrid controller 100 may efficiently deliver control signals to optimize the operation of the microgrid 24B. As mentioned above, the recloser 28B may be opened between the area EPS 22B and the microgrid 24B resulting in an islanded microgrid 24B that operates independently from the area EPS 22B.

Figure 4:
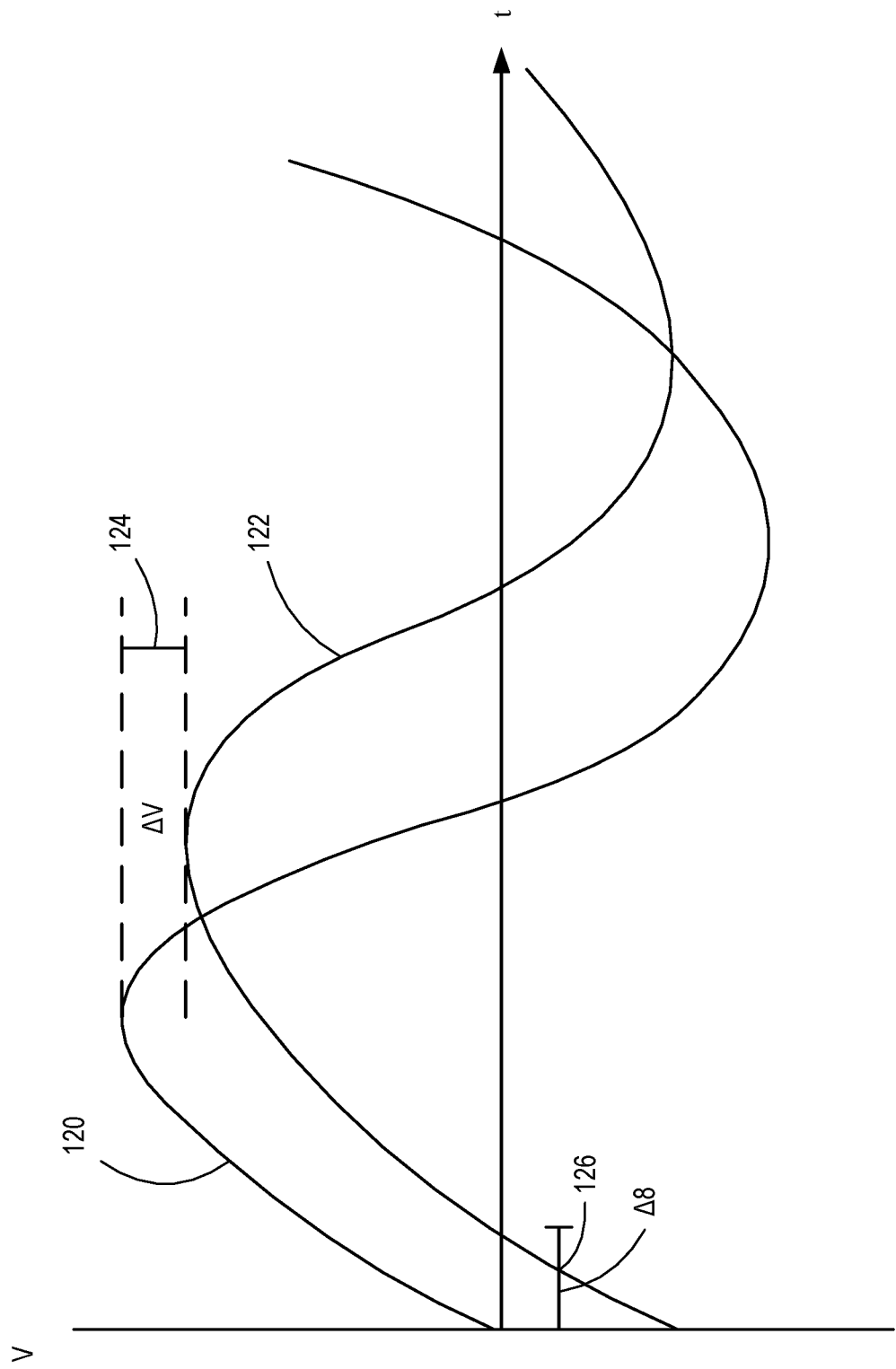
FIG. 4 is a plot of a voltage signal of the microgrid to be synchronized with a voltage signal of the area EPS via the recloser control at the PCC, in accordance with an embodiment.

FIG. 4 is a plot of area EPS voltages 120 and microgrid voltages 122 with respect to time, in accordance with an embodiment. The area EPS voltages 120 may operate at a different magnitude ($\Delta V$ 124), a different phase ($\Delta \delta$ 126), a different frequency, or any combination thereof, than the microgrid voltages 122. Prior to reclosing the recloser 28 and reconnecting the microgrid 24 to the area EPS 22, the microgrid voltages 122 may be synchronized to the area EPS voltages 120.

Figure 5:
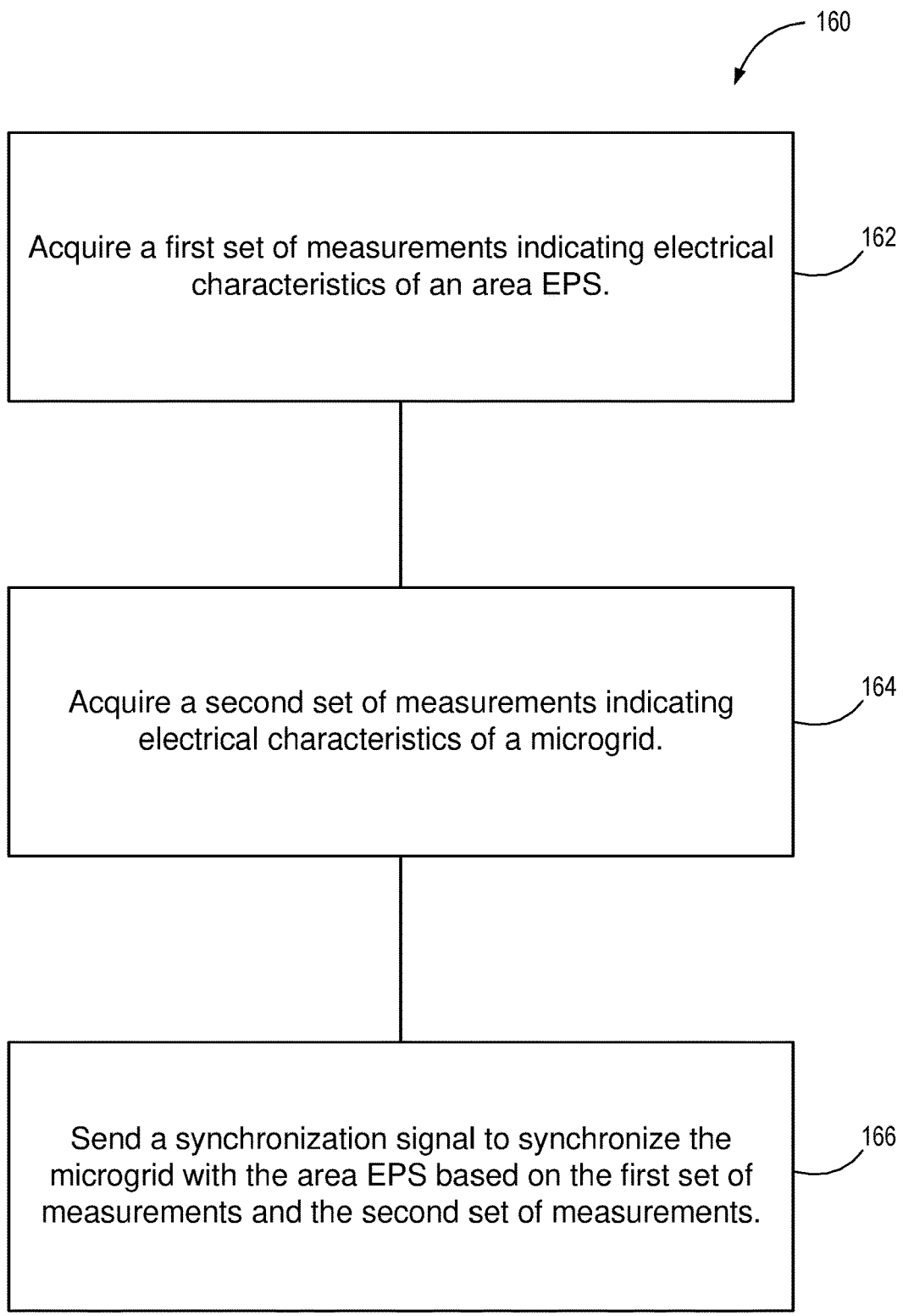
FIG. 5 is a flow diagram of process that may be performed by the recloser control of FIG. 1 to synchronize the DERs of the microgrid to the area EPS, in accordance with an embodiment.

FIG. 5 is a flow chart of a process 160 that may be performed by the recloser control 30 to synchronize the microgrid voltages to the area EPS voltages, in accordance with an embodiment. This process 160 may be performed while the recloser 28 is open and the microgrid 24A is islanded. The process 160 may begin by the recloser control 30 acquiring a first set of measurements indicating electrical characteristics of an area EPS 22 (block 162). As mentioned above, the first set of measurements may be voltage measurements acquired via the potential transformer 82.

The recloser control 30 may acquire a second set of measurements indicating electrical characteristics of a microgrid (block 164). In some embodiments, the second set of measurements may be voltage measurements acquired via the potential transformer 80. In other embodiments, the second set of measurements may be acquired by the recloser control 30 via communication from one or more DER controllers.

The recloser control 30 may send a synchronization signal to synchronize the microgrid with the area EPS 22 based on the first set of measurements and the second set of measurements. For example, referring to FIG. 2, the recloser control 30A may send the synchronization signal to one or more DER controllers (e.g., load controller 90, first generator controller 92, second generator controller 94, or any combination thereof) to synchronize the one or more DERs (e.g., load 62, first distributed generator 64, second distributed generator 66) to the area EPS 22A based on the first set of measurements and the second set of measurements. That is, the recloser control 30A may send one or more synchronization signal(s) that indicate the voltage magnitude difference 124, the phase difference 126, the frequency difference, or any combination thereof. The synchronization signal(s) may be pulse width signal(s) having a pulse width that is of a width corresponding to (e.g., matching in length) the voltage magnitude difference 124, the phase difference 126, or the frequency difference. By providing these differences 124 and 126 to the DER controllers, the voltage characteristics of the microgrid 24 may be synchronized to the voltage characteristics of the area EPS 22A. For instance, the distributed generator controllers 92 and 94 may increase fuel/decrease to the generators to reduce the phase and/or frequency differences between the microgrid 24 and the area EPS 26.

In other embodiments, the recloser control 30 may send a synchronization signal to synchronize the microgrid controller to allow the microgrid controller to synchronize the one or more DERs to the area EPS 22. For example, the recloser control 30 may send synchronization signal(s) that indicate the voltage magnitude difference 124, the phase difference 126, the frequency difference, or any combination thereof, to the microgrid controller 100. The synchronization signal(s) may be pulse width signal(s) having a pulse width that is of a width corresponding to (e.g., matching in length) the voltage magnitude difference 124, the phase difference 126, or the frequency difference.

The microgrid controller 100 may determine optimal control of the DERs 62, 64, and 66 to synchronize the microgrid 24B to the area EPS 22B. For instance, the recloser control 30 may send a synchronization signal indicating the phase difference 126 to the microgrid controller 100. Based on the phase difference 126, the microgrid controller 100 may send control signals to generator controller 92 to adjust the phase of the microgrid 24B to align with the phase of the area EPS 22B.

In some embodiments, the recloser control 30 may determine whether the first set of measurements and the second set of measurements are within a window of each other. The recloser control 30 may send a signal to the recloser 28 to close the recloser 28 upon determining that the first set of measurements and the second set of measurements are within the window. In some embodiments, the windows may be set by a user that configures the size of the difference between the microgrid and the macrogrid in which the voltages are considered synchronized. For example, the recloser control 30 may determine that the voltage magnitude of the area EPS 22 and the voltage magnitude of the microgrid 24 are within a voltage magnitude tolerance, the phase difference between the area EPS 22 and the microgrid 24 are within a phase difference tolerance, and the frequency of the area EPS 22 and the microgrid 24 are within a frequency tolerance. Upon synchronizing the microgrid to the area EPS 22 and the microgrid 24 via the DER controllers and/or the microgrid controller, the recloser control 30 may reconnect the area EPS 22 with the microgrid 24 via closing of the recloser 28 which may allow the microgrid 24 to receive power from or provide power to the area EPS 22.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
    a recloser control, comprising:
        an output connector configured to be communicatively coupled to a recloser at a point of common coupling (PCC) between an area electric power system (EPS) in an electric power delivery system and a microgrid in the electric power delivery system;
        a memory; and
        one or more processors operatively coupled to the memory, wherein the one or more processors are configured to:
            send a trip signal to the recloser to trip the recloser to an open position, thereby islanding the microgrid from the area EPS;
            acquire a first set of measurements indicating electrical characteristics of the area EPS;
            acquire a second set of measurements indicating electrical characteristics of the microgrid; and
            send a synchronization signal to a microgrid controller of the microgrid indicating a difference between the first set of measurements and the second set of measurements to adjust the electrical characteristics of the microgrid to synchronize the microgrid to the area EPS;
    the microgrid controller configured to:
        receive the synchronization signal from the recloser control indicating the difference between the first set of measurements and the second set of measurements;
        determine an optimal control of a plurality of distributed energy resources (DERs) to synchronize the microgrid with the area EPS according to the difference; and
        send a control signal to at least one of the plurality of DERs to adjust a setting of the at least one of the plurality of DERs to cause the at least one of the plurality of DERs to adjust the electrical characteristics of the microgrid to synchronize the microgrid with the area EPS;
    wherein the one or more processors of the recloser control are configured to:
        following sending the synchronization signal, determine that the microgrid has been synchronized to the area EPS by determining that the first set of measurements and the second set of measurements are within a window of each other; and
        upon confirming that the microgrid has been synchronized to the area EPS, sending a close command to close the recloser.

2. The system of claim 1, wherein the one or more processors are configured to determine a phase difference as the difference between the area EPS and the microgrid while the microgrid is islanded, wherein the synchronization signal comprises an indication of the phase difference to allow the microgrid controller to synchronize one or more DERs of the microgrid with the area EPS.

3. The system of claim 1, wherein the first set of measurements comprise a frequency, a phase, and a magnitude of the area EPS, and wherein the second set of measurements comprise a frequency, a phase, and a magnitude of the microgrid.

4. The system of claim 1, wherein the synchronization signal comprises a pulse width signal having a width proportional to a phase difference between the microgrid and the area EPS.

5. The system of claim 1, wherein the processor is configured to send the synchronization signal comprising an indication to increase the frequency or the decrease the frequency of the microgrid.

6. The system of claim 1, wherein the processor is configured to send the synchronization signal comprising an indication to raise the voltage or to lower the voltage of the microgrid.

7. The system of claim 1, comprising a first potential transformer configured to be communicatively coupled between the recloser and the area EPS to allow the recloser control to acquire the first set of measurements indicating electrical characteristics of the area EPS and a second potential transformer communicatively coupled between the recloser and the microgrid to allow the recloser control to acquire the second set of measurements while the microgrid is islanded from the area EPS.

8. The system of claim 1, wherein the microgrid controller comprises a real-time automation controller that controls the plurality of distributed energy resources within the microgrid.

9. The system of claim 1, wherein the recloser control is configured to perform synchronization upon lockout of the recloser.

10. The system of claim 9, wherein the recloser control attempts to close the recloser a plurality of times prior to lockout of the recloser.

11. A non-transitory, computer readable medium comprising instructions that, when executed by one or more processors, cause operations comprising:
   sending, from a recloser control, a trip signal to a recloser at a point of common coupling (PCC) to trip the recloser to an open position, thereby islanding a microgrid from an area electric power system (EPS);
   acquiring, via the recloser control, a first set of measurements indicating electrical characteristics of the area EPS;
   acquiring, via the recloser control, a second set of measurements indicating electrical characteristics of the microgrid; and
   sending, via the recloser control, a synchronization signal to a microgrid controller of the microgrid indicating a difference between the first set of measurements and the second set of measurements to allow the microgrid controller to adjust the electrical characteristics of the microgrid to synchronize the microgrid to the area EPS based on the first set of measurements and the second set of measurements;
   receiving, via the microgrid controller, the synchronization signal from the recloser control indicating the difference between the first set of measurements and the second set of measurements;
   determining, via the microgrid controller, an optimal control of a plurality of distributed energy resources (DERs) to synchronize the microgrid with the area EPS according to the difference;
   sending, via the microgrid controller, a control signal to at least one of the plurality of DERs to adjust a setting of the at least one of the plurality of DERs to cause the at least one of the plurality of DERs to adjust the electrical characteristics of the microgrid to synchronize the microgrid with the area EPS;
   following sending the synchronization signal, confirming, via the recloser control, that the microgrid has been synchronized to the area EPS by determining that the first set of measurements and the second set of measurements are within a window of each other; and
   upon confirming that the microgrid has been synchronized to the area EPS, sending, via the recloser control, a close command to the recloser to close the recloser.

12. The non-transitory, computer readable medium of claim 11, wherein the first set of measurements comprise a frequency, a phase, and a magnitude of the area EPS, and wherein the second set of voltage characteristics comprise a frequency, a phase, and a magnitude of the microgrid.

13. The non-transitory, computer readable medium of claim 11, comprising instructions that, when executed by the one or more processors, cause operations comprising determining a phase difference between voltages of the area EPS and voltages of the microgrid, wherein the synchronization signal comprises an indication of the phase difference to allow the microgrid controller to synchronize the microgrid with the area EPS.

14. A method of commissioning a recloser control in an electric power delivery system, comprising:
   communicatively coupling the recloser control with a recloser at a point of common coupling between a microgrid of the electric power delivery system and an area electric power system (EPS) of the electric power delivery system;
   coupling a first sensor between the recloser and the area EPS to allow the recloser control to receive a first set of measurements indicating electrical characteristics of the area EPS;
   coupling a second sensor between the recloser and the microgrid to allow the recloser control to receive a second set of measurements indicating electrical characteristics of the microgrid;
   setting the recloser control to send a synchronization signal to a microgrid controller indicating a difference between the first set of measurements and the second set of measurements to allow the microgrid controller to synchronize the microgrid to the area EPS and to, upon confirming that the microgrid has been synchronized to the area EPS by the microgrid controller, sending a close command to close the recloser, thereby reconnecting the microgrid to the area EPS; and
   setting the microgrid controller to receive the synchronization signal from the recloser control indicating the difference between the first set of measurements and the second set of measurements, to determine control of a plurality of distributed energy resources (DERs) to synchronize the microgrid with the area EPS according to the difference, and to send a control signal to at least one of the plurality of DERs to adjust a setting of the at least one of the plurality of DERs to cause the at least one of the plurality of DERs to synchronize the electrical characteristics of the microgrid with the electrical characteristics of the area EPS.

15. The method of claim 14, comprising setting a window size of a voltage difference between a first set of voltage measurements representative of voltages of the area EPS and a second set of voltage measurements representative of voltages of the microgrid in which to close the recloser.

16. The method of claim 15, comprising coupling a first potential transformer between the recloser and the area EPS as the first sensor to allow the recloser control to receive the first set of voltage measurements.

17. The method of claim 15, comprising coupling a second potential transformer between the recloser and the microgrid as the second sensor to allow the recloser control to receive the second set of voltage measurements.

* * * * *